(12) United States Patent
Liu

(10) Patent No.: US 8,136,844 B1
(45) Date of Patent: Mar. 20, 2012

(54) HOSE CONNECTION STRUCTURE OF AIR MATTRESS

(75) Inventor: Ching-Fong Liu, Taipei (TW)

(73) Assignee: Caremed Supply Inc., Taipei (TW)

( * ) Notice: Subject to any disclaimer, the term of this patent is extended or adjusted under 35 U.S.C. 154(b) by 93 days.

(21) Appl. No.: 12/868,079

(22) Filed: Aug. 25, 2010

(51) Int. Cl.
*F16L 39/00* (2006.01)

(52) U.S. Cl. ..... 285/124.3; 285/9.1; 285/45; 285/124.1; 285/124.4; 285/124.5

(58) Field of Classification Search ............... 285/124.1, 285/124.2, 124.3, 124.4, 124.5, 188, 9.1, 285/45; 5/726
See application file for complete search history.

(56) References Cited

U.S. PATENT DOCUMENTS

| | | | | |
|---|---|---|---|---|
| 3,469,863 A * | 9/1969 | Riester et al. | ............. | 285/124.4 |
| 4,377,291 A * | 3/1983 | Albertini | ....................... | 277/619 |
| 6,926,311 B2 * | 8/2005 | Chang et al. | .................. | 285/317 |
| 7,464,966 B2 * | 12/2008 | Miyajima et al. | .......... | 285/124.3 |
| 2002/0163187 A1 * | 11/2002 | Pelfrey et al. | ............. | 285/124.1 |
| 2009/0066079 A1 * | 3/2009 | Miros et al. | ................ | 285/124.5 |

* cited by examiner

*Primary Examiner* — James Hewitt
(74) *Attorney, Agent, or Firm* — Rosenberg, Klein & Lee

(57) ABSTRACT

A hose connection structure for an air mattress and includes a casing, a plurality of pipe fitting units, a retention board and a resilient buckle. The plurality of pipe fitting units is first jointed together to form an assembly, which is then combined with the retention board and the resilient buckle to then mount inside the casing. The pipe fitting units each comprise a plurality of pipe fittings each having a rear end coupled to an air hose extending to an air mattress. A projection formed on the retention board and a barb formed on the resilient buckle are then put into engagement with a connector of an air pump so as to realize connection of multiple hoses and loosening resistance.

3 Claims, 6 Drawing Sheets

HOSE CONNECTION STRUCTURE OF AIR MATTRESS

BACKGROUND OF THE INVENTION

1. Field of the Invention

The present invention generally relates to an improved structure of hose connection for an air mattress, and more particularly to a multi-fitting hose connection structure for use with an air mattress of a medical bed, which is composed of a casing, a plurality of pipe fitting units, a retention board and a resilient buckle, wherein the pipe fitting units, the retention board, and the resilient buckle are combined together as an assembly that is then set inside the casing for releasably coupling with a connector of an air pump so as to provide for connecting multiple air hoses and increases loosening resistance.

2. Description of the Related Art

A hose connection structure of a conventional air mattress of a medical bed is shown in FIG. 4. The conventional hose connection structure 40 is integrally formed by injection molding and comprises a plurality of pipe fittings 41 and two resilient plastic side barbs 42. In the conventional structure, when the hose connection structure is put into engagement with a connector of an air pump (not shown), the engagement of connection is maintained by the two resilient plastic side barbs 42 engaging the connector. The resilient barbs 42 that are made of plastics are soft and flexible in structure so that in a practical application, tough situations, including air charging, air hose shaking, and being forcibly pulled, may occur to loosen and thus separate the hose connection structure from the air pump. Further, the state-of-the-art technology only allows for a single array of three juxtaposing pipe fittings for hose connection and thus, an air mattress that is inflated through the hose connection can only be divided into three separated zones, often a head zone, a back zone, and a leg zone, for controlling and operation. When one of these zones leaks, then the leaking zone becomes deflated and loses the support function thereof. Thus, the conventional device only allows for limited variation of control and thus does not meet practical requirements.

The demand of improved functionality of the air mattress is getting higher and higher. For example, an air mattress is now divided into more and more separated zones to allow each separated zone to carry only a small area of a user's body and a small fraction of the body weight. This also allows for individual control of inflation timing of each inflatable zone for alternately inflating and deflating each individual zone so as to alleviate pain and occurrence of poor blood circulation and bedsores caused by fixed and long-term contact with a fully inflated zone. Further, the alternation of inflation and deflation provides an effect of body massage that further alleviates the occurrence of pains and bedsores. Currently, a need for hose connection that connects six to nine air hoses is emerging. Further, a more secured coupling of the hose connection that connects a greater number of air hoses is also needed. Apparently, an improvement of the conventional hose connection structure is needed.

In view of the problems that the known hose connection structure is not capable of providing sufficient connection with a large number of air hoses and that the know connection structure is not of sufficient coupling strength to carry the large number of air hoses, the present invention aims to provide a novel hose connection structure for an air mattress that eliminates the above discussed problems.

SUMMARY OF THE INVENTION

The primary purpose of the present invention is to provide a hose connection structure for an air mattress, which arranges a plurality of pipe fittings inside a casing and provides tough coupling for operation so as to provide for connecting of multiple air hoses and increases loosening resistance.

To achieve the above objectives, the present invention provide a hose connection structure for an air mattress, comprising a casing, a plurality of pipe fitting units, a retention board a resilient buckle and a magnet, wherein the casing is composed of two halves having a front open having an inside wall defining a groove and a rear end forming a cover board forming a plurality of circular holes; the pipe fitting units are made of injection-molded plastics and each composed of a plurality of juxtaposing pipe fittings, the plurality of pipe fitting units being jointed together through bolts in a vertically stacked manner; the retention board is coupled to a front end of the jointed pipe fitting units by bolts and is fit into the groove in the opening of the casing, the retention board forming a plurality of circular holes, the retention board forming on an edge thereof a projection and a recess in an edge opposite to the projection, the retention board forming a groove; the magnet is disposed in the groove; and the resilient buckle is mounted to an outside of one of the pipe fitting units through bolts to have a barb thereof extending through the recess of the retention board to project frontward of the casing to engage an air pump; wherein numbers and locations of the circular holes of the casing and the circular holes of the retention board correspond to number and locations of the pipe fittings of the jointed pipe fitting units.

To use the above described structure, the present invention joints two or three identical pipe fitting units to the retention board and the resilient buckle to form an assembly, which is then fit into and fixed inside the casing. Each pipe fitting is coupled, at a rear end thereof, to an air hose that extends to an air mattress. The projection that is formed on an edge of the retention board, which is made of metal, and the barb of the resilient buckle are respectively put into engagement with a connector of an air pump so as to realize connection of multiple air hoses and loosening resistance.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
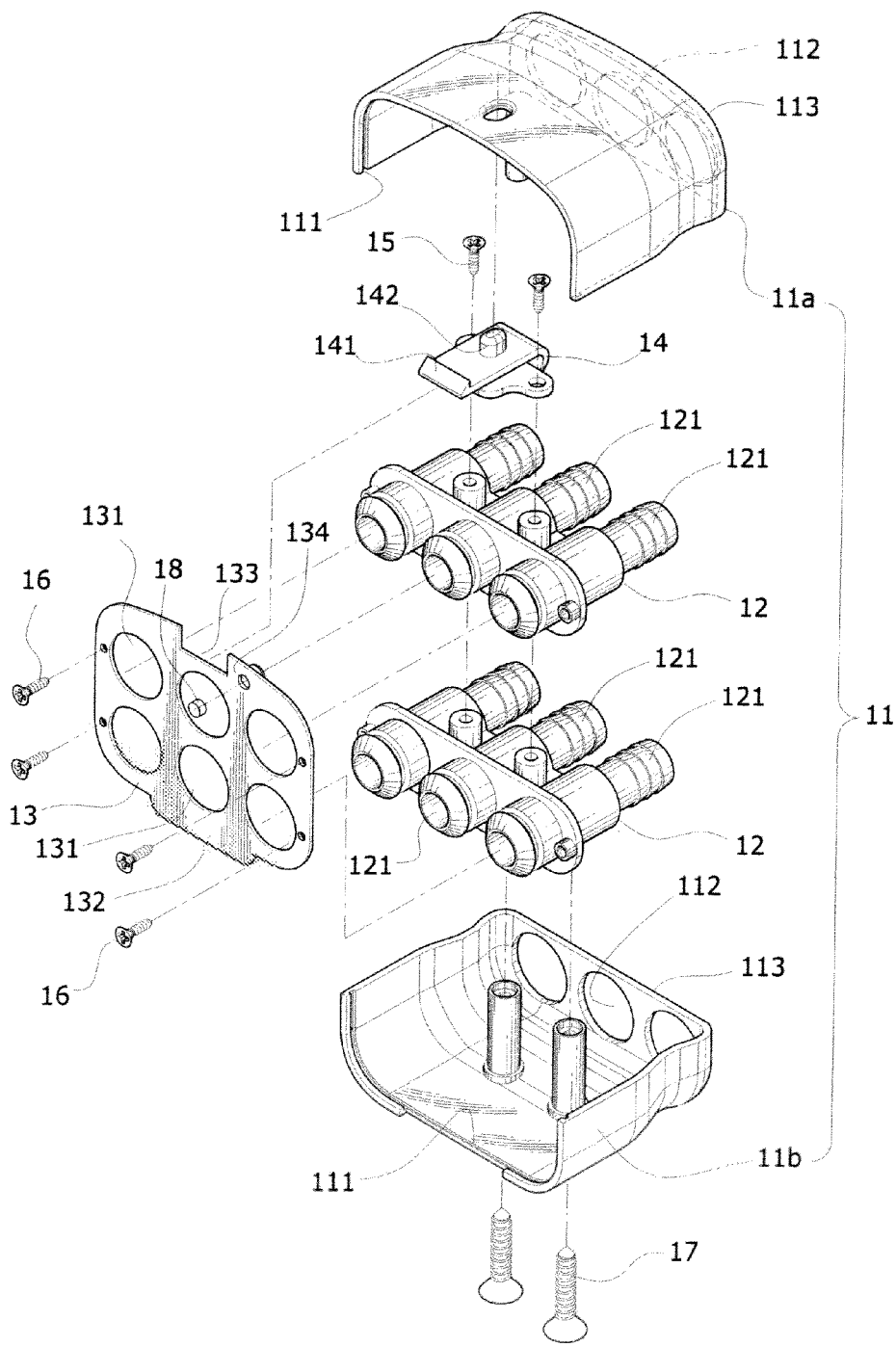
FIG. 1 is an exploded view of a hose connection structure in accordance with the present invention.
Figure 2:
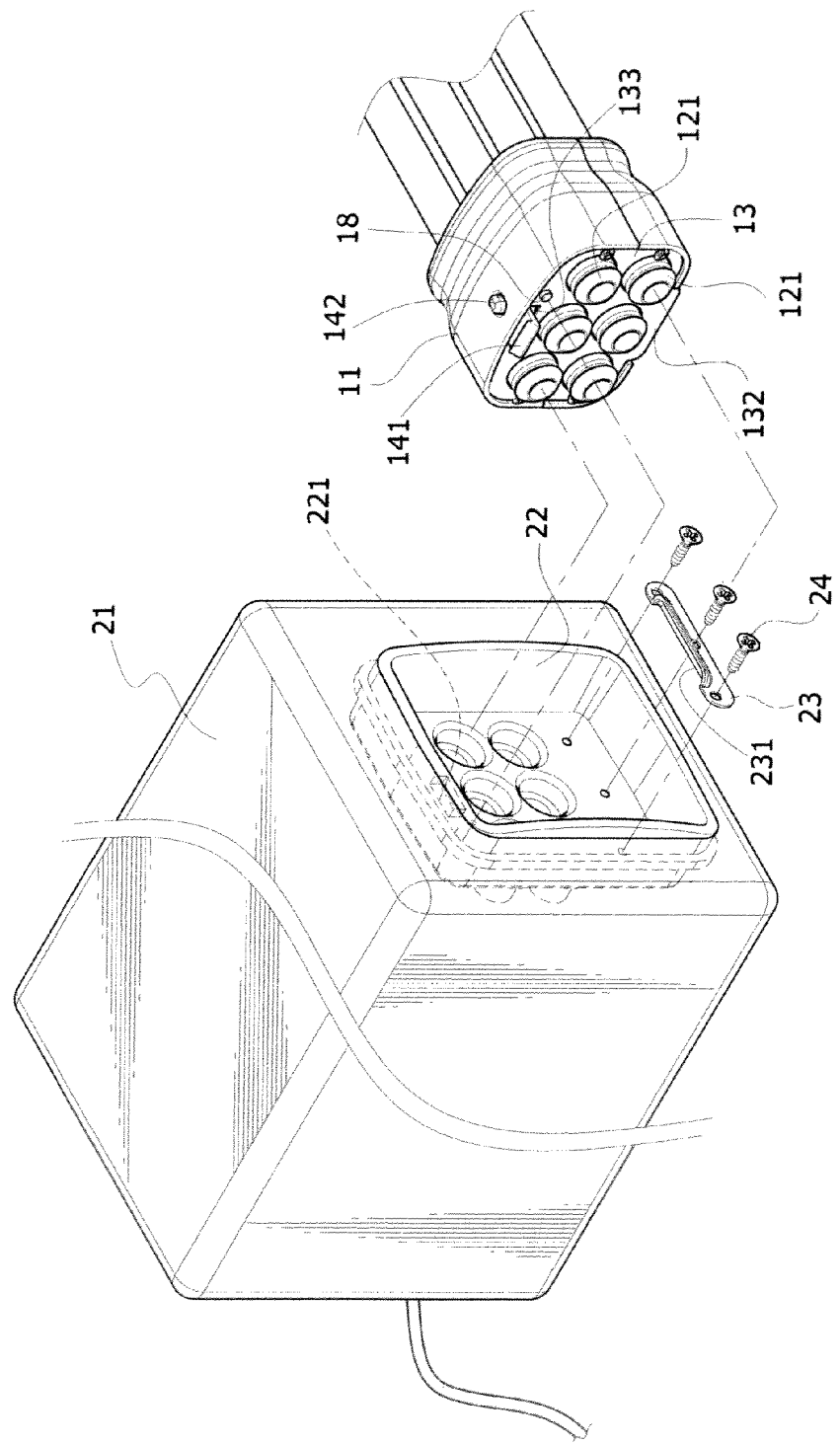
FIG. 2 is a perspective view of the hose connection structure of the present invention, showing an application thereof to connect with an air pump.
Figure 3:
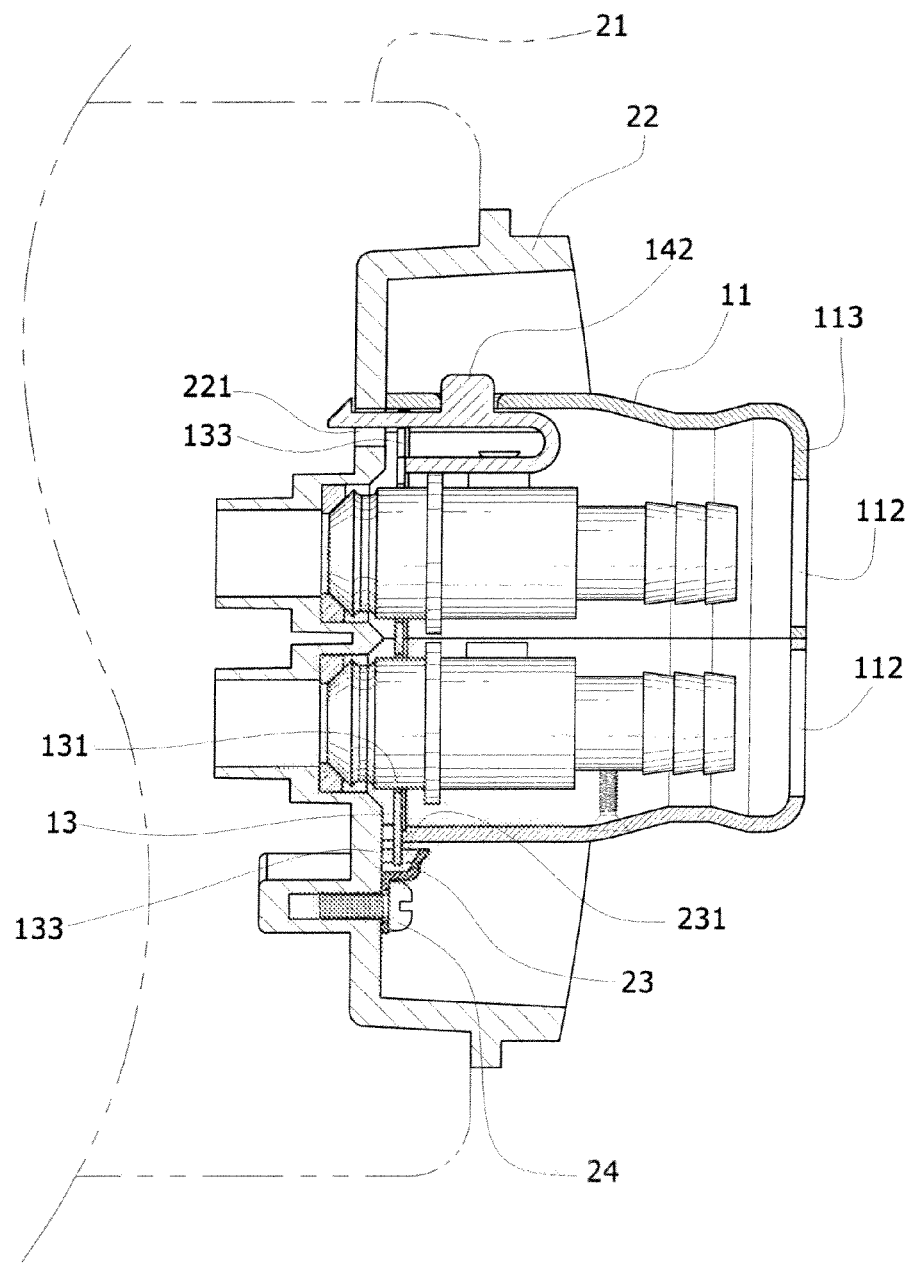
FIG. 3 is a cross-sectional view of the hose connection structure of FIG. 1 in an assembled form.
Figure 4:
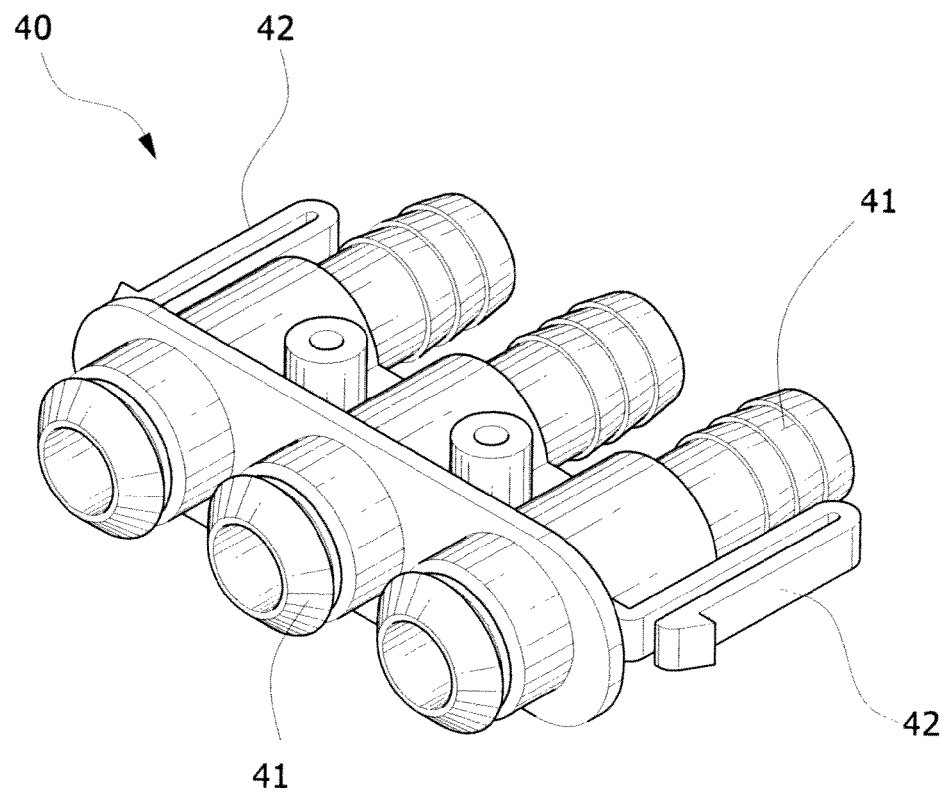
FIG. 4 is a perspective view showing a conventional hose connection structure.
Figure 5:
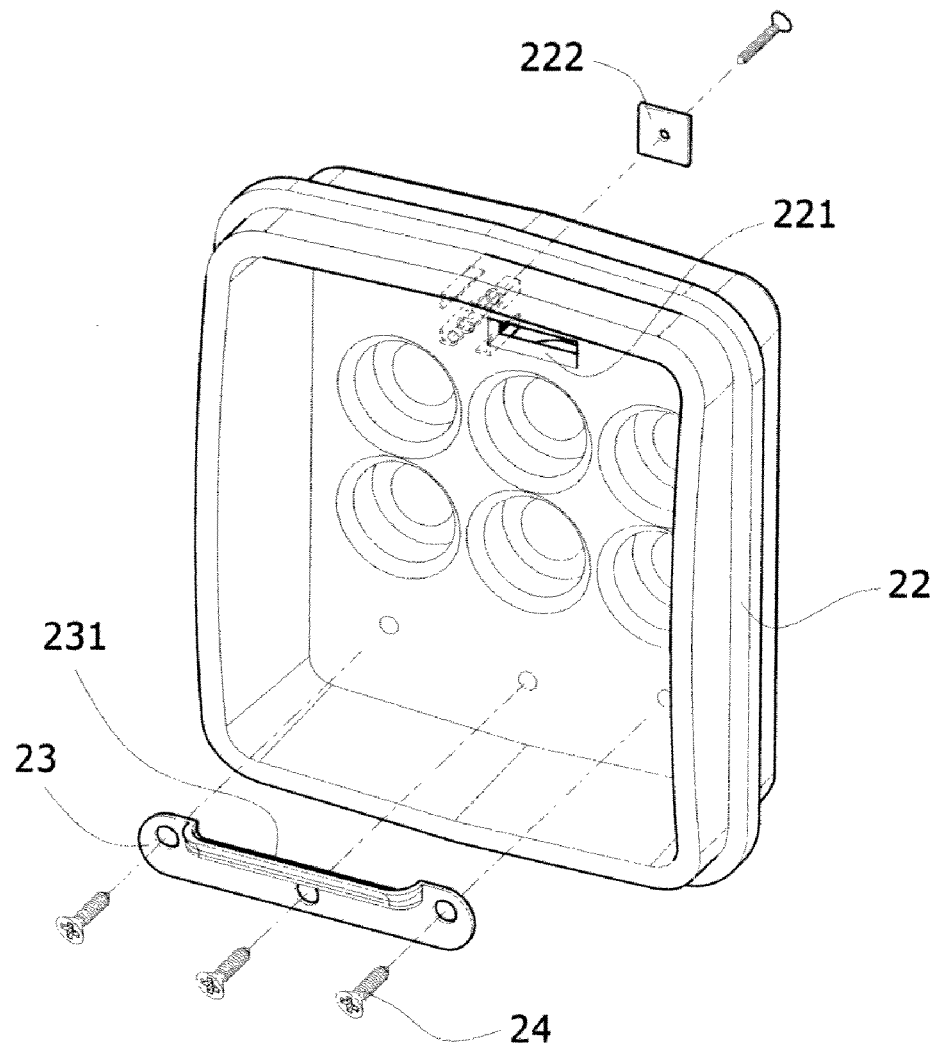
FIG. 5 is an exploded view of a connector in accordance with the present invention.
Figure 6:
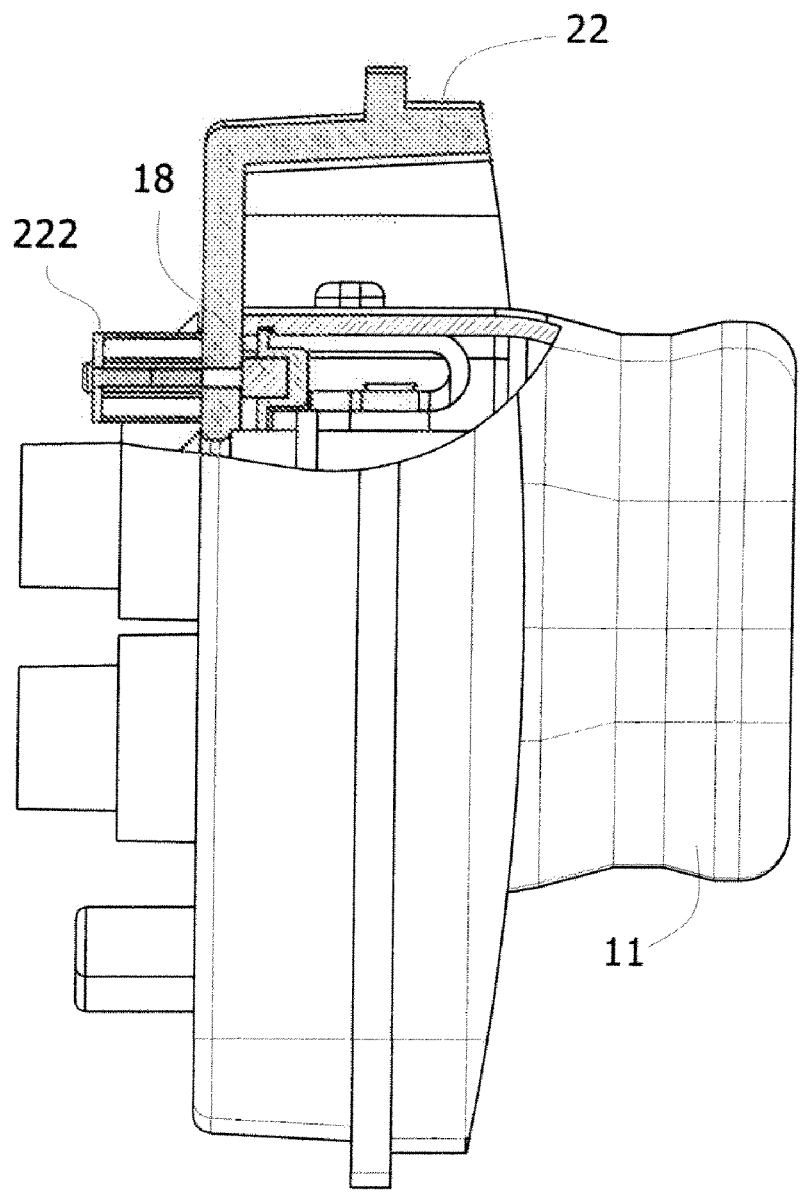
FIG. 6 is a relative position view of a magnet and a circuit board in accordance with the present invention.

With reference to the drawings and in particular to FIGS. 1-3, a hose connection structure in accordance with the present invention is provided for an air mattress and comprises a casing 11, a plurality of pipe fitting units 12, a retention board 13 and a resilient buckle 14. The casing 11 is composed of two mated casing halves 11a, 11b. The casing halves 11a, 11b have a front opening having an inside wall forming a groove 111 and a rear end forming a cover board 113 through which a plurality of circular holes 112 is defined. The pipe fitting unit 12 is made of injection-molded plastics and is composed of a plurality of juxtaposing pipe fittings 121. The plurality of pipe fitting units 12, of which the number is two in the embodiment illustrated, is jointed together through bolts 15 in a vertically stacked manner. The retention board 13 is coupled to a front end of the jointed pipe fitting units 12 by bolts 16 and is fit into the groove 111 in the opening of the casing 11 with a circumferential edge thereof. The retention board 13 forms a plurality of circular holes 131. The retention board 13 forms on an edge thereof a projection 132 and a recess 133 in an edge opposite to the projection 132. The resilient buckle 14 is mounted to an outside of one of the pipe fitting units 12 through the bolts 15, which are the bolts jointing the one of the pipe fitting units 12 in the embodiment illustrate, to have a barb 141 extending through the recess 133 of the retention board 13 to project frontward of the casing 11. Further, the numbers and locations of the circular holes 112 of the casing 11 and the circular holes 131 of the retention board 13 correspond to the number and locations of the pipe fittings 121 of the plurality of pipe fitting units 12 that is jointed together.

With the structure described above, in the embodiment illustrated, each pipe fitting unit 12 is composed of three juxtaposing pipe fittings 121 and two or three pipe fitting units 12 are jointed together to form an assembly. Thus, in the instant embodiment, after being jointed, the assembly of the pipe fitting units 12 comprises fix pipes to be respectively connected to six air hoses to allow for more elaborate design of the functions associated with the air mattress, such as to alleviate the pain that a patient lying on the mattress may feel and to avoid the occurrence of bedsores of the patient. Further, a connector 22 that is provided on an air pump 21 (see FIG. 2) forms a coupling plate 23 made of metal and a coupling slot 221 respectively corresponding in position to the projection 132 and the barb 141 of the resilient buckle 14 that projects frontward. The coupling plate 23 is fixed to the connector 22 by bolts 24 and defines a slot 231 for receiving and engaging the projection 132 of the retention board 13. The resilient buckle 14 is provided with a depressible button 142 mounted to an outside surface of a resilient arm carrying the barb 141 (see FIGS. 1 and 3). The depressible button 142 is formed to expose outside the casing 11 when the resilient buckle 14 and other components are assembled to the casing 11, whereby the barb 141 is insertable into and engageable with the coupling slot 221 of the connector 22 of the air pump and the engagement is selectively broken by depression of the depressible button 142.

Referring to FIGS. 2 and 3, with the structure described above, in use, the present invention joints two or three identical pipe fitting units 12 to the retention board 13 and the resilient buckle 14 to form an assembly, which is then fit into and fixed inside the casing 11. Bolts 17 are then used to secure the two casing halves 11a, 11b together to make the hose connection structure a unitary device (see FIG. 2). In the structure of the present invention, each pipe fitting 121 is coupled, at a rear end thereof, to an air hose 31 that extends to the air mattress (not shown in the drawings). The projection 132 that is formed on an edge of the retention board 13, which is made of metal, and the barb 141 of the resilient buckle 14 are respectively put into engagement with the coupling plate 23 and the coupling slot 221 of the connector of the air pump in such a way that the projection 132 of the retention board 13 is first fit into the slot 231 of the coupling plate 23, which is also made of metal, as shown in FIG. 3, and then the barb 141 of the resilient buckle 14 is forced into the coupling slot 221 of the connector 22 to thereby realize fast coupling. To release the coupling, the depressible button 142 that is exposed at one side of the casing 11 is depressed and the hose connection structure of the present invention is removed from the connector of the air pump in a reversed sequence. In this way, connection of multiple air hoses and loosening resistance are realized.

Moreover, the hose connection structure further comprises a magnet 18, the retention board 13 further comprises a groove 134, and the magnet 18 is disposed in the groove 134. The connector 22 further comprises a circuit board 222 corresponding to the magnet 18. When the hose connection structure is mounted and fixed to the connector 22, the circuit board 222 will detect the magnetic force produced by the magnet 18, so that the workers can make assurance of the assembly state of the connection structure, thus facilitate the assembling workforce, as shown in FIGS. 1,2,5 and 6.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

What is claimed is:

1. A hose connection structure for an air mattress, comprising a casing, a plurality of pipe fitting units, a retention board, a resilient buckle and a magnet, wherein:

the casing is composed of two halves having a front opening having an inside wall defining a groove and a rear end forming a cover board forming a plurality of circular holes;

the pipe fitting units are made of injection-molded plastics and each composed of a plurality of juxtaposing pipe fittings, the plurality of pipe fitting units being jointed together through bolts in a vertically stacked manner;

the retention board is coupled to a front end of the jointed pipe fitting units by bolts and is fit into the groove in the opening of the casing, the retention board forming a plurality of circular holes, the retention board forming on an edge thereof a projection and a recess in an edge opposite to the projection, the retention board forming a groove;

the magnet is disposed in the groove; and the resilient buckle is mounted to an outside of one of the pipe fitting units through bolts to have a barb thereof extending through the recess of the retention board to project frontward of the casing and adapted to engage an air pump;

wherein numbers and locations of the circular holes of the casing and the circular holes of the retention board correspond to numbers and locations of the pipe fittings of the jointed pipe fitting units.

2. The hose connection structure according to claim 1, wherein each pipe fitting unit is composed of three pipe fittings juxtaposing each other.

3. The hose connection structure according to claim 1, wherein the resilient buckle comprises a resilient arm that carries the barb and a depressible button is formed on the resilient buckle and is exposed outside the casing whereby depression of the depressible button breaks the engagement of the barb with the air pump.

* * * * *